United States Patent
Wakabayashi et al.

(10) Patent No.: US 12,128,872 B2
(45) Date of Patent: Oct. 29, 2024

(54) DRIVING FORCE CONTROL SYSTEM FOR HYBRID VEHICLE

(71) Applicant: TOYOTA JIDOSHA KABUSHIKI KAISHA, Toyota (JP)

(72) Inventors: Hideto Wakabayashi, Numazu (JP); Masahiro Sato, Susono (JP); Seitaro Misawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 79 days.

(21) Appl. No.: 18/307,095

(22) Filed: Apr. 26, 2023

(65) Prior Publication Data
US 2023/0398976 A1 Dec. 14, 2023

(30) Foreign Application Priority Data
May 18, 2022 (JP) .................. 2022-081290

(51) Int. Cl.
*B60W 20/00* (2016.01)
*B60W 20/13* (2016.01)
*B60W 20/16* (2016.01)
*F01N 11/00* (2006.01)
*F02D 41/02* (2006.01)

(52) U.S. Cl.
CPC ........... *B60W 20/16* (2016.01); *B60W 20/13* (2016.01); *F01N 11/002* (2013.01); *F02D 41/0235* (2013.01); *B60W 2510/244* (2013.01); *F01N 2550/04* (2013.01)

(58) Field of Classification Search
CPC ............... B60W 20/16; B60W 20/13; B60W 2510/244; B60W 2530/12; B60W 2710/0677; B60W 10/08; B60W 10/26; B60W 10/06; B60W 20/00; B60W 20/15; B60W 20/20; B60W 40/00; F01N 11/002; F01N 2550/04; F01N 2900/06; F01N 2900/08; F01N 2900/104; F01N 2900/1606; F01N 3/023; F02D 41/0235; B60Y 2300/476

See application file for complete search history.

(56) References Cited

U.S. PATENT DOCUMENTS

2002/0043410 A1* 4/2002 Suzuki ..................... F01P 11/20
    903/903
2004/0045753 A1* 3/2004 Yamaguchi ......... B60L 15/2072
    180/65.28

(Continued)

FOREIGN PATENT DOCUMENTS

JP      2009-24559 A     2/2009
WO   WO-2019145618 A1 * 8/2019 ............... B60K 6/48

*Primary Examiner* — Matthew T Largi
(74) *Attorney, Agent, or Firm* — Oblon, McClelland, Maier & Neustadt, L.L.P.

(57) ABSTRACT

A driving force control system for a hybrid vehicle configured to prevent an increase in emission while achieving a required driving force in a condition where an accumulation of particulate matter on a particulate filter is small. A controller is configured to set a threshold level of an SOC level of a battery to shift from a motor mode to a hybrid mode to a higher level and set an upper limit power of an engine in the hybrid mode to a lower power, in a situation where the amount of particulate matter accumulated in a GPF is equal to or smaller than a predetermined amount.

5 Claims, 3 Drawing Sheets

(56) References Cited

U.S. PATENT DOCUMENTS

| | | | |
|---|---|---|---|
| 2009/0321164 A1* | 12/2009 | Andri | B60W 20/18 |
| | | | 180/65.265 |
| 2017/0066435 A1* | 3/2017 | Morisaki | B60W 10/08 |
| 2019/0315334 A1* | 10/2019 | Endo | B60W 10/08 |
| 2020/0070851 A1* | 3/2020 | Kato | B60W 50/12 |
| 2020/0139956 A1* | 5/2020 | Muta | B60K 6/24 |
| 2020/0139957 A1* | 5/2020 | Muta | B60L 50/62 |
| 2020/0158039 A1* | 5/2020 | Aoki | B60W 20/00 |
| 2020/0317187 A1* | 10/2020 | Assaliyski | B60W 20/13 |
| 2020/0331453 A1* | 10/2020 | Yonezawa | B60W 20/16 |
| 2021/0129825 A1* | 5/2021 | Piper | B60W 20/13 |

* cited by examiner

DRIVING FORCE CONTROL SYSTEM FOR HYBRID VEHICLE

CROSS-REFERENCE TO RELATED APPLICATIONS

The present disclosure claims the benefit of Japanese Patent Application No. 2022-081290 filed on May 18, 2022 with the Japanese Patent Office, the disclosures of which are incorporated herein by reference in its entirety.

BACKGROUND

Field of the Disclosure

Embodiments of the present disclosure relate to the art of a driving force control system for a hybrid vehicle in which a prime mover includes an internal combustion engine and a motor.

Discussion of the Related Art

JP-A-2009-24559 describes an exhaust emission control system for preventing an increase in exhaust emission during execution of regeneration process of particulate matter captured by a particulate filter. To this end, the exhaust emission control system described in JP-A-2009-24559 is configured to reduce a flow rate of the exhaust gas flowing into the particulate filter during execution of the particulate matter regeneration process. According to the teachings of JP-A-2009-24559, specifically, the exhaust emission control system is configured to reduce an air intake to an engine and a flow rate of an exhaust gas emitted from the engine, or increase a rate of an EGR. That is, the exhaust emission control system prevents a discharge of the particulate matter through the particulate filter by restricting an engine output, when a cross-sectional area of the particulate filter through which the exhaust gas flows is increased as a result of executing the particulate matter regeneration process.

Thus, the exhaust emission control system taught by JP-A-2009-24559 restricts the engine output to prevent an increase in the exhaust emission during execution of the particulate matter regeneration process. Therefore, the engine may not be allowed to generate a driving force required by a driver during execution of the particulate matter regeneration process.

SUMMARY

Aspects of embodiments of the present disclosure have been conceived noting the foregoing technical problems, and it is therefore an object of the present disclosure to provide a driving force control system for a hybrid vehicle configured to prevent an increase in emission while achieving a required driving force in a condition where an accumulation of particulate matter on a particulate filter is small.

According to the exemplary embodiment the present disclosure, there is provided a driving force control system that is applied to a hybrid vehicle comprising: a prime mover including an engine and a motor; a particulate filter that captures particulate matter contained on an exhaust gas emitted from the engine; and an electric storage device that supplies electric power to the motor. An operating mode of the hybrid vehicle may be selected at least from: a hybrid mode in which the hybrid vehicle is propelled by at least a part of a power generated by the engine and a power generated by the motor; and a motor mode in which the hybrid vehicle is propelled only by the power generated by the motor. In order to achieve the above-explained objective, according to the exemplary embodiment the present disclosure, the driving force control system is provided with a controller that controls the engine and the motor. Specifically, the controller is configured to: shift the operating mode from the motor mode to the hybrid mode based on a state of charge level of the electric storage device; and set a threshold level of the state of charge level to shift the operating mode from the motor mode to the hybrid mode to a higher level and set an upper limit power of the engine in the hybrid mode to a lower power in a situation where the amount of the particulate matter accumulated in the particulate filter is equal to or smaller than a predetermined amount, compared to the threshold level and the upper limit power set in a situation where the amount of the particulate matter accumulated in the particulate filter is greater than the predetermined amount.

In a non-limiting embodiment, the controller may be further configured to increase the power of the engine within a range lower than the upper limit power with a decrease in the state of charge level, in the situation where the amount of the particulate matter accumulated in the particulate filter is equal to or smaller than the predetermined amount.

In a non-limiting embodiment, the controller may be further configured to set a target power of the engine with respect to a power required to propel the hybrid vehicle to a higher value in the situation where the amount of the particulate matter accumulated in the particulate filter is equal to or smaller than the predetermined amount, compared to the target power set in the situation where the amount of the particulate matter accumulated in the particulate filter is greater than the predetermined amount.

In a non-limiting embodiment, the controller may be further configured to: determine the amount of the particulate matter accumulated in the particulate filter based on a pressure difference between upstream and downstream of the particulate filter; and detect the pressure difference in the motor mode by flowing gas containing air through the particulate filter by rotating the engine while stopping a fuel supply to the engine.

Thus, in the situation where the amount of the particulate matter accumulated in the particulate filter is equal to or smaller than the predetermined amount, the power of the engine is restricted to the upper limit power in the hybrid mode so that a flow rate of the exhaust gas flowing through the particulate filter is reduced. According to the exemplary embodiment of the present disclosure, therefore, emission of the particulate matter through the particulate filter may be reduced, that is, the exhaust gas may be purified. In addition, even when the power of the engine is restricted, the driving force required to propel the hybrid vehicle may be achieved by an assist torque of the motor.

In addition, in the situation where the amount of the particulate matter accumulated in the particulate filter is equal to or smaller than the predetermined amount, the threshold level to shift the operating mode from the motor mode to the hybrid mode is set to a higher level. According to the exemplary embodiment of the present disclosure, therefore, a lack of electric power to be supplied to the motor may be prevented despite an increased electric consumption during restriction of the engine torque. For this reason, reduction in the driving force due to lack of electric power may be prevented. In addition, increase in the exhaust gas due to increase in the power of the engine may also be prevented.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Embodiments of the present disclosure will now be explained with reference to the accompanying drawings. Note that the embodiments shown below are merely examples of the present disclosure, and do not limit the present disclosure.

Figure 1:
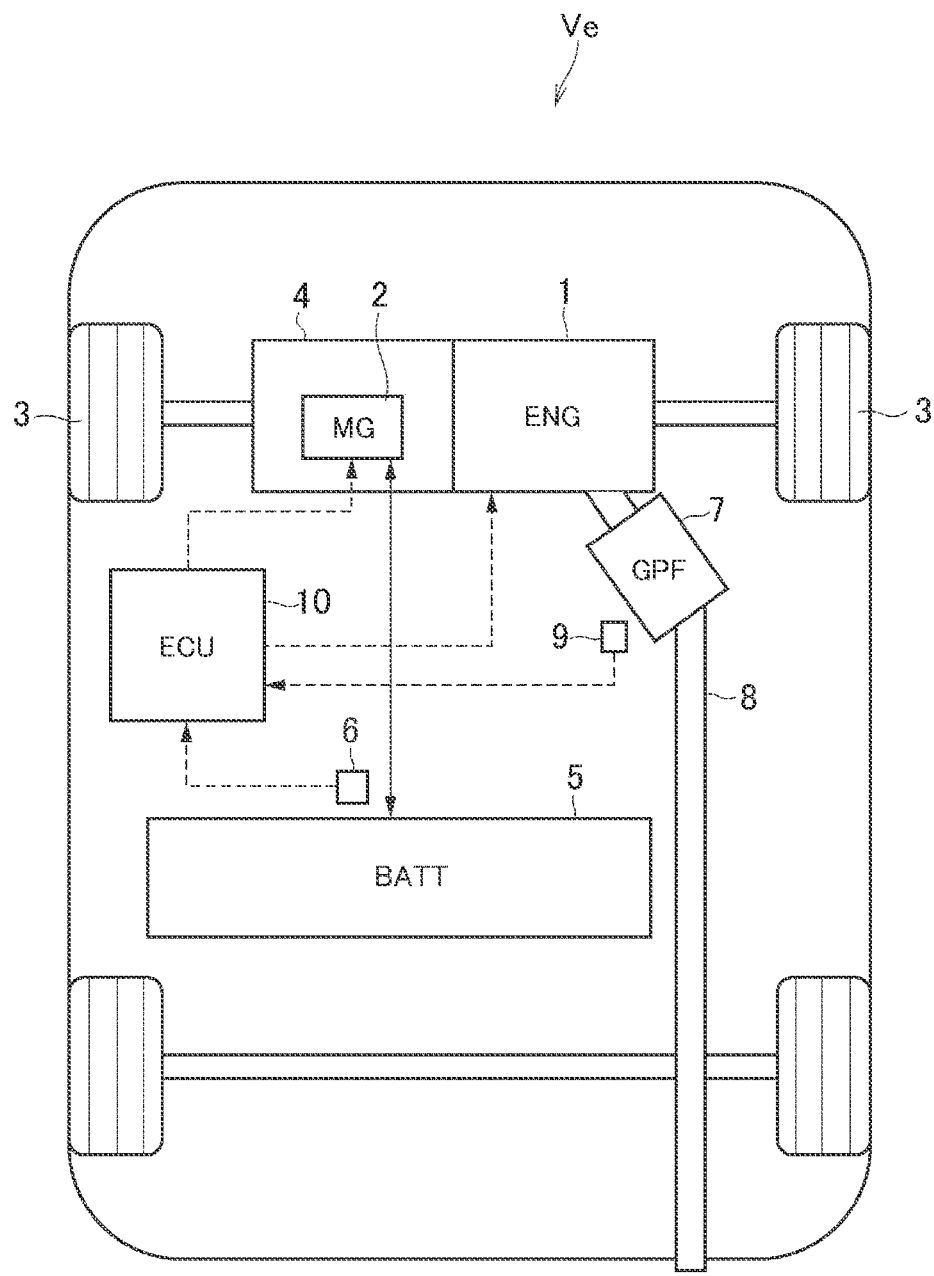
FIG. 1 is a schematic illustration showing one example of a structure of a hybrid vehicle to which the driving force control system according to the embodiment of the present disclosure is applied.

Referring now to FIG. 1, there is shown one example of a structure of a vehicle Ve to which the driving force control system according to the exemplary embodiment of the present disclosure is applied. The vehicle Ve shown in FIG. 1 is a hybrid vehicle in which a prime mover includes an internal combustion engine (referred to as "ENG" in FIG. 1) 1, and a drive motor (referred to as "MG" in FIG. 1) 2 serving as a motor of the embodiment of the present disclosure.

For example, a conventional gasoline engine or diesel engine may be adopted as the engine 1, and the engine 1 generates power by burning air/fuel mixture. In order to deliver the power of the engine 1 to a pair of front wheels 3, an output shaft (not shown) of the engine 1 is connected to a powertrain 4.

The powertrain 4 comprises a power split mechanism that distributes torque of the engine 1 to the pair of front wheels 3 and a generator (not shown), and a differential gear unit that distributes the torque delivered from the engine 1 to the front wheels 3. For example, a single-pinion planetary gear unit may be adopted as the power split mechanism. Specifically, the power split mechanism comprises: a sun gear; a ring gear arranged concentrically around the sun gear; a plurality of pinion gears interposed between the sun gear and the ring gear while meshing with those gears; and a carrier that supporting the pinion gears in a rotatable manner.

A reaction motor (not shown) serving as the generator is connected to the sun gear, the engine 1 is connected to the carrier, and the differential gear unit is connected to the ring gear through a geartrain. The drive motor 2 is connected to any one of rotary members closer to the front wheels 3 than the ring gear in a torque transmission path. Instead, the drive motor 2 may also be connected to a pair of rear wheels so as to deliver torque thereof to the rear wheels.

As the conventional motors employed in electric vehicles and hybrid vehicles, the drive motor 2 serves as a motor to generate power when energized, and as a generator to generate electricity when rotated passively. For example, a permanent magnet synchronous motor and an induction motor may be adopted as the drive motor 2. Likewise, such motor having a generating function may also be adopted as the above-mentioned reaction motor.

The drive motor 2 and the reaction motor are electrically connected to an electric storage device (referred to as "BATT" in FIG. 1) 5 of relatively high voltage. Therefore, those motors are operated as a motor by electric power supplied from the electric storage device 5, and the electric storage device 5 is charged with electric powers generated by those motors. The drive motor 2 and the reaction motor are also electrically connected to each other so that any one of the motors (e.g., the drive motor 2) may be operated as a motor by operating the other one of the motors (i.e., the reaction motor) as a generator to supply electric power generated by the reaction motor to the drive motor 2 without passing through the electric storage device 5. For example, the electric storage device 5 includes a conventional secondary battery and a capacitor. In addition, in order to detect a state of charge (to be abbreviated as SOC hereinafter) level of the electric storage device 5, the electric storage device 5 is provided with an SOC sensor 6.

In the vehicle Ve, the drive torque generated by the engine 1 is delivered to the front wheels 3 via the power split mechanism to propel the vehicle Ve by generating a reaction torque by the reaction motor. In order to propel the vehicle Ve, the drive motor may also be operated to generate a drive torque. In the case of operating the reaction motor as a generator to deliver the power of the engine 1 to the front wheels 3, the electric power generated by the reaction motor is supplied to the drive motor 2 at least partially to operate the drive motor 2 as a motor. In addition, the electric power may also be supplied to the drive motor 2 from the electric storage device 5 to operate the drive motor 2 as a motor. That is, the electric power corresponding to a difference between the amount of electric power generated by the reaction motor and the amount of electric power supplied to the drive motor 2 is accumulated in the electric storage device 5. In the exemplary embodiment of the present disclosure, an operating mode in which the vehicle Ve is propelled by delivering the torque from the engine 1 to the front wheels 3 is referred to as a hybrid mode (to be abbreviated as HV mode hereinafter).

In the vehicle Ve, the drive motor 2 is connected mechanically to the front wheels 3 so that the vehicle Ve may be propelled by delivering the torque from the drive motor 2 to the front wheels 3 while stopping combustion of the engine 1, in other words, without generating the drive torque by the engine 1. In the exemplary embodiment of the present disclosure, an operating mode in which the vehicle Ve is propelled by delivering the torque only from the drive motor 2 is referred to as a motor mode (to be abbreviated as EV mode hereinafter).

During propulsion in the HV mode, an exhaust gas containing particulate matter is emitted from the engine 1 as a result of combustion of the air/fuel mixture. Therefore, in order to prevent emission of particulate matter to outside of the vehicle Ve, a gasoline particulate filter (to be abbreviated as GPF hereinafter) 7 is arrange on an exhaust pipe 8. In the GPF 7, a plurality of pores are formed to let through the exhaust gas and to capture the particulate matter. In addition, the GPF 7 may serve as a catalyst converter to purify the exhaust gas by oxidizing and reducing nitrogen oxide, carbon monoxide, or carbon hydride contained in the exhaust gas. To this end, platinum, palladium, rhodium, etc. are applied to walls of the pores of the GPF 7.

In order to estimate the amount of the particulate matter accumulated in the GPF 7, a difference between pressures of upstream and downstream of the GPF 7 is detected by a pressure difference sensor 9. The control system according to the exemplary embodiment of the present disclosure determines that a large amount of the particulate matter is accumulated in the GPF 7 if the abovementioned pressure difference is large. When the amount of particulate matter accumulated in the GPF 7 exceeds a predetermined amount, the control system oxidizes and removes the particulate matter accumulated in the GPF 7 by the regeneration process described in JP-A-2009-24559.

In order to control the engine 1 and the drive motor 2, the vehicle Ve shown in FIG. 1 is provided with an electronic control unit (to be abbreviated as the ECU hereinafter) 10 having a microcomputer as its main constituent. The ECU 10 is configured to calculate output torques of the engine 1 and the drive motor 2 based on incident data transmitted from sensors as well as maps and formulas installed in advance, and transmits calculation results to the engine 1 and the drive motor 2 in the form of command signal.

To this end, for example, signals are transmitted to the ECU 10 from the pressure difference sensor 9, the SOC sensor 6, an accelerator sensor that detects a position of an accelerator pedal (neither of which are shown), and a vehicle speed sensor that detects a speed of the vehicle Ve.

In a case that the amount of particulate matter accumulated in the GPF 7 is small, a cross-sectional area of the GPF 7 through which the exhaust gas flows is large. In this case, therefore, capturing performance of the GPF 7 is reduced. That is, if a flow rate of the exhaust gas flowing through the GPF 7 is high immediately after the assembly of the vehicle Ve or immediately after the execution of the regeneration process of the particulate matter, the particulate matter contained in the exhaust gas may be emitted from the vehicle Ve through the GPF 7. In order to avoid such disadvantage, the ECU 10 is configured to restrict an output of the engine 1 in the case that the amount of the particulate matter accumulated in the GPF 7 is small. However, if the output of the engine 1 is restricted, a required driving force may not be generated. Therefore, in order to achieve the required driving force during propulsion in the HV mode, the ECU 10 is configured to generate a power by the engine 1 to a restricted upper limit, and to operate the drive motor 2 to compensate for the lack of power.

Figure 2:
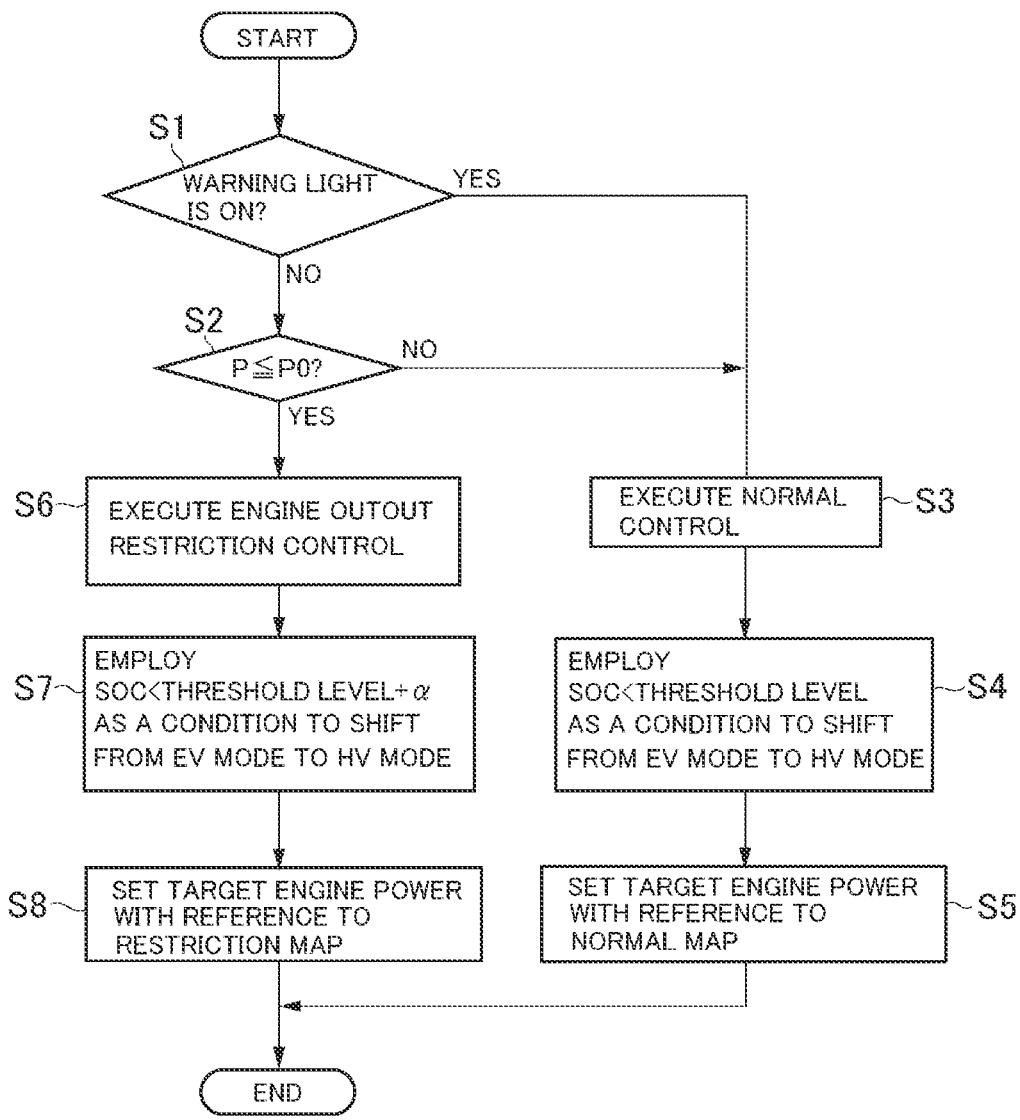
FIG. 2 is a flowchart showing a one example of a routine executed by the driving force control system according to the embodiment of the present disclosure.

To this end, according to the exemplary embodiment of the present disclosure, the ECU 10 executes a routine shown in FIG. 2. In the routine shown in FIG. 2, at step S1, it is determined whether an engine warning light is on to notify a driver of a failure of the engine 1. Specifically, the ECU 10 has a fault diagnosis function to determine a failure of the engine 1 based on detection values of the sensors arranged in the vehicle Ve, and such determination at step S1 is made utilizing the fault diagnosis function.

If the engine warning light is off so that the answer of step S1 is NO, the routine progresses to step S2 to determine whether the difference between the pressures of the upstream and the downstream of the GPF 7 detected by the pressure difference sensor 9 (hereinafter referred to as pressure difference P) is equal to or smaller than a predetermined value P0. Such determination at step S2 is made to determine whether the particulate matter contained in the exhaust gas has accumulated in the GPF 7 to the extent possible to be captured when the engine 1 generates the maximum power. To this end, the amount of the particulate matter accumulated on the GPF 7 necessary to reduce a flow rate of the exhaust gas flowing into the GPF 7 is set in advance, and for example, the predetermined value P0 is set to the pressure difference P at the above-mentioned amount of the particulate matter accumulated on the GPF 7. Instead, the predetermined value P0 may also be varied in accordance with a flow rate of the exhaust gas flowing toward the GPF 7.

For example, during propulsion in the EV mode, the pressure difference P may be detected at step S2 by the pressure difference sensor 9 while flowing gas containing air through the exhaust pipe 8 by motoring the engine 1 and stopping fuel supply to the engine 1. Instead, a difference between pressures of the upstream and the downstream of the GPF 7 immediately before shifting the operating mode from the HV mode to the EV mode which is stored in the ECU 10 may also be employed at step S2 as the pressure difference P.

If the engine warning light is on so that the answer of step S1 is YES, or if the pressure difference P is greater than the predetermined value P0 so that the answer of step S2 is NO, the routine progresses to step S3 to execute a normal control. Specifically, in the case that the answer of step S1 is YES, the torque to propel the vehicle Ve is controlled taking account of the failure of the engine 1. Whereas, in the case that the answer of step S2 is NO, the operating mode of the vehicle Ve is selected in accordance with a position of the accelerator pedal and a speed of the vehicle Ve, and the torques of the engine 1 and the drive motor 2 are controlled in the normal manner depending on the selected operating mode.

According to the exemplary embodiment of the present disclosure, the driving force control system is configured to change a condition to shift the operating mode from the EV mode to the HV mode and a target power of the engine 1 with respect to a power required by the driver, depending on the amount of the particulate matter accumulated on the GPF 7. Here will be explained the condition to shift the operating mode from the EV mode to the HV mode and the target power of the engine 1 in the HV mode, under the situation where the amount of the particulate matter accumulated on the GPF 7 is large and hence the normal control is selected.

In this case, after the normal control is commenced at step S3, the routine progresses to step S4 to set the condition to shift the operating mode from the EV mode to the HV mode. At step S4, specifically, a fact that an SOC level of the electric storage device 5 is lower than a threshold level is employed as the condition to shift the operating mode from the EV mode to the HV mode. For example, the threshold level may be set to an allowable lower limit level of the electric storage device 5 governed by the characteristics of the electric storage device 5.

Figure 3:
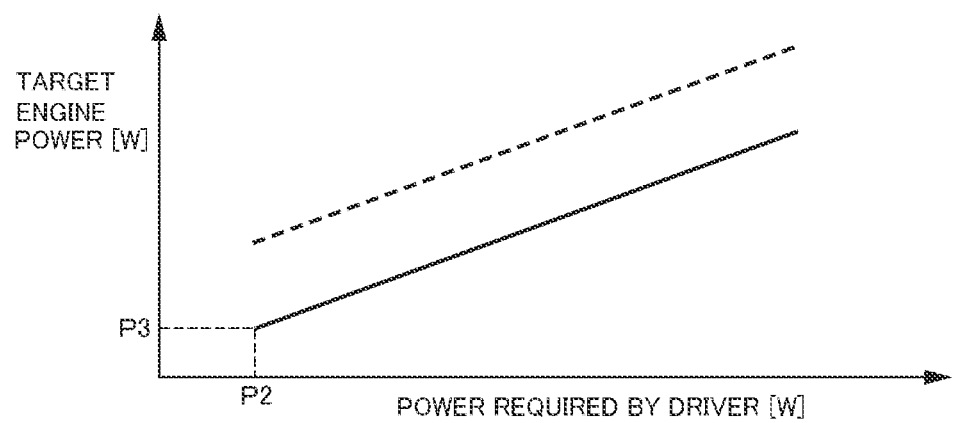
FIG. 3 is a map employed during execution of a normal control to determine a target power of the engine.

Then, the target power of the engine 1 with respect to the power required by the driver is determined at step S5 with reference to a map shown in FIG. 3, and thereafter the routine returns. In the map shown in FIG. 3, the horizontal axis represents the power required by the driver, the vertical axis represents the target power of the engine 1, the solid line indicates the target power of the engine 1 with respect to the power required by the driver for the case in which the SOC level of the electric storage device 5 is high, and the dashed line indicates the target power of the engine 1 with respect to the power required by the driver for the case in which the SOC level of the electric storage device 5 is low. The map shown in FIG. 3 is configured to set the target power of the engine 1 to a total value of: the power required by the driver; and a power required to charge the electric storage device 5. That is, the target power of the engine 1 is increased with an increase in the power required by the driver and a decrease in the SOC level of the electric storage device 5. Specifically, the power required by the driver may be calculated based on a position of the accelerator pedal and a speed of the vehicle Ve.

Whereas, in a case that the pressure difference P is equal to or less than the predetermined value P0 so that the answer of step S2 is YES, the particulate matter may be emitted through the GPF 7 in a high-power range if the output power of the engine 1 is controlled with reference to the map shown in FIG. 3. In the case that the answer of step S2 is YES, therefore, the routine progresses to step S6 to execute an engine power restriction control to restrict the output power of the engine 1 to a predetermined power. As described later, as a result of restricting the output power of the engine 1, the drive torque generated by the drive motor 2 is increased to achieve a required driving force to propel the vehicle Ve, and hence the SOC level of the electric storage device 5 is decreased at a faster rate.

Therefore, when the engine power restriction control is commenced, a timing to shift the operating mode from the EV mode to the HV mode is advanced. To this end, the routine progresses to step S7 to set the condition to shift the operating mode from the EV mode to the HV mode. At step S7, specifically, the threshold level of the SOC level of the electric storage device 5 to shift the operating mode from the EV mode to the HV mode is set to a higher level than that in the normal control. That is, at step S7, an available time to generate an assist torque by the drive motor 2 during propulsion in the HV mode is extended. For this purpose, at step S7, an additional value a is added to the threshold level employed in the normal control. The additional value a may be not only a fixed value but also a variable that is varied e.g., in accordance with a history of the power required by the driver, and depending on a situation (e.g., when travelling along a mountain road).

Figure 4:
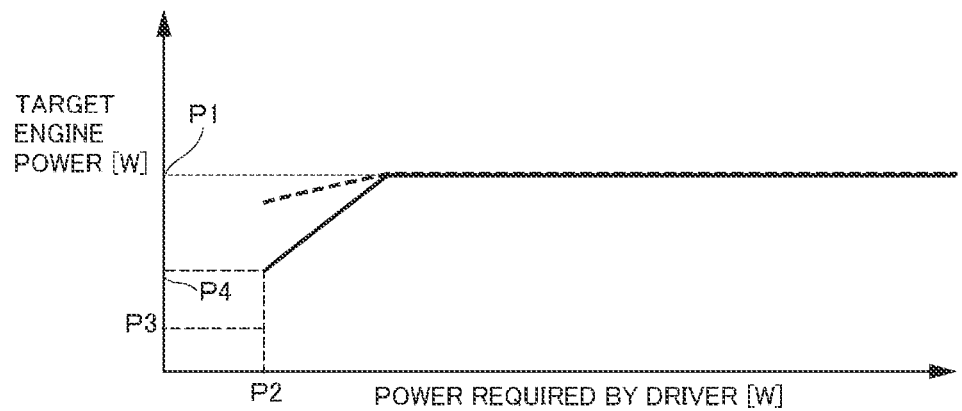
FIG. 4 is map employed during execution of an engine power restriction control to determine a target power of the engine.

Then, the target power of the engine 1 with respect to the power required by the driver is determined at step S8 with reference to a map shown in FIG. 4, and thereafter the routine returns. In the map shown in FIG. 4, the horizontal axis also represents the power required by the driver, the vertical axis also represents the target power of the engine 1, the solid line also indicates the target power of the engine 1 with respect to the power required by the driver for the case in which the SOC level of the electric storage device 5 is high, and the dashed line also indicates the target power of the engine 1 with respect to the power required by the driver for the case in which the SOC level of the electric storage device 5 is low. As shown in FIG. 4, the map shown therein is configured to set an upper limit power P1 of the output power of the engine 1. Specifically, the upper limit power P1 is set to a value possible to capture all of the particulate matter contained in the exhaust gas of the engine 1 flowing into the GPF 7. That is, in this case, the engine 1 is operated while restricting the output power to the upper limit power P1 that is lower than the maximum output power governed by the specifications of the engine 1.

In this case, given that the power required by the driver falls below a low-load range that is lower than the upper limit power P1 of the engine 1, the target power of the engine 1 is set to a total value of: the power required by the driver; and a power required to charge the electric storage device 5. That is, the target power of the engine 1 is increased with an increase in the power required by the driver and a decrease in the SOC level of the electric storage device 5. In addition, the map shown in FIG. 4 is further configured to increase the target power of the engine 1 to charge the electric storage device 5 in the low-load range higher than that set by the map shown in FIG. 3. For example, given that the normal control is in execution and that the power required by the driver is P2, the target power of the engine 1 is set to P3 to charge the electric storage device 5 as shown in FIG. 3. Whereas, given that the engine power restriction control is in execution and that the power required by the driver is P2, the target power of the engine 1 is set to P4 to charge the electric storage device 5 that is higher than P3 by a predetermined value as shown in FIG. 4.

In this case, during propulsion in a high-load range where the power required by the driver is higher than the upper limit power P1 of the output power of the engine 1, the engine 1 is operated to generate the upper limit power P1 and the electric power corresponding to a shortage of power to achieve the power required by the driver is supplied to the drive motor 2 from the electric storage device 5.

Thus, when the pressure difference P between upstream and downstream of the GPF 7 is small, that is, when an accumulation of particulate matter in the GPF 7 is small, a flow rate of the exhaust gas flowing through the GPF 7 may be reduced by restricting the output power of the engine 1. Consequently, emission of the particulate matter through the GPF 7 may be reduced, that is, the exhaust gas may be purified. Specifically, according to the exemplary embodiment of the present disclosure, the output power of the engine 1 is restricted to the upper limit power possible to capture the particulate matter by the GPF 7. According to the exemplary embodiment of the present disclosure, therefore, the particulate matter may be captured promptly by the GPF 7 thereby improving the particulate matter capturing performance of the GPF 7 promptly. For this reason, the restriction of the output power of the engine 1 may be cancelled promptly.

In addition, even when the output power of the engine 1 is restricted, the driving force required by the driver to propel the vehicle Ve may be achieved by the assist torque of the drive motor 2. In this case, the operating mode is shifted from the EV mode to the HV mode at a higher SOC level of the electric storage device 5. Therefore, the SOC level of the electric storage device 5 will not fall excessively despite an increased electric consumption during restriction of the engine torque. For this reason, reduction in the driving force due to lack of electric power may be prevented. In addition, increase in the exhaust gas due to increase in the output power of the engine 1 may also be prevented.

Further, when the vehicle Ve is propelled in the low-load range during execution of the engine power restriction control, the target power of the engine 1 is increased compared to the target power set during execution of the normal control so that the SOC level of the electric storage device 5 may be maintained to a high level. Therefore, the SOC level of the electric storage device 5 will not fall promptly to the lower limit level during propulsion in the high-load range. For this reason, reduction in the driving force due to lack of electric power may be prevented. In addition, increase in the exhaust gas due to increase in the output power of the engine 1 may also be prevented.

Although the above exemplary embodiments of the present disclosure have been described, it will be understood by those skilled in the art that the present disclosure should not be limited to the described exemplary embodiments, and various changes and modifications can be made within the scope of the present disclosure. As described, in the exemplary embodiment of the present disclosure, the driving force control system is applied to a series-parallel hybrid vehicle in which the electric storage device 5 is charged by the generator, and the drive motor 2 generates an assist torque. Instead, the driving force control system according to the exemplary embodiment of the present disclosure may also be applied to a series hybrid vehicle in which a power of an engine is translated into an electric power by a generator, and a motor is operated to propel the hybrid vehicle by electric powers supplied from the generator and a battery. In this case, in a hybrid mode, the power of the engine is translated into the electric power by the generator, and in a motor mode, the engine is stopped and the electric power is supplied to the motor only from the battery. In addition, the driving force control system according to the exemplary embodiment of the present disclosure may also be applied to a parallel hybrid vehicle without having a generator in which an engine and a motor are connected top drive wheels. In this case, in a hybrid mode, powers of the engine and the motor are delivered to the drive wheels, and in a motor mode, the engine is stopped and the power is delivered to the drive wheels only from the motor. In a case of restricting an output power of the engine in the parallel hybrid vehicle, the foregoing controls may be executed by operating the motor as a generator in a low-load range.

What is claimed is:

1. A driving force control system for a hybrid vehicle comprising:
    a prime mover including an engine and a motor;
    a particulate filter that captures particulate matter contained on an exhaust gas emitted from the engine; and
    an electric storage device that supplies electric power to the motor,
    wherein an operating mode of the hybrid vehicle is selected at least from
    a hybrid mode in which the hybrid vehicle is propelled by at least a part of a power generated by the engine and a power generated by the motor, and
    a motor mode in which the hybrid vehicle is propelled only by the power generated by the motor,
    the driving force control system further comprises a controller that controls the engine and the motor,
    the controller is configured to
    shift the operating mode from the motor mode to the hybrid mode based on a state of charge level of the electric storage device, and
    set a threshold level of the state of charge level to shift the operating mode from the motor mode to the hybrid mode to a higher level and set an upper limit power of the engine in the hybrid mode to a lower power in a situation where amount of the particulate matter accumulated in the particulate filter is equal to or smaller than a predetermined amount, compared to the threshold level and the upper limit power set in a situation where the amount of the particulate matter accumulated in the particulate filter is greater than the predetermined amount.

2. The driving force control system for the hybrid vehicle as claimed in claim 1, wherein the controller is further configured to increase the power of the engine within a range lower than the upper limit power with a decrease in the state of charge level, in the situation where the amount of the particulate matter accumulated in the particulate filter is equal to or smaller than the predetermined amount.

3. The driving force control system for the hybrid vehicle as claimed in claim 1, wherein the controller is further configured to set a target power of the engine with respect to a power required to propel the hybrid vehicle to a higher value in the situation where the amount of the particulate matter accumulated in the particulate filter is equal to or smaller than the predetermined amount, compared to the target power set in the situation where the amount of the particulate matter accumulated in the particulate filter is greater than the predetermined amount.

4. The driving force control system for the hybrid vehicle as claimed in claim 2, wherein the controller is further configured to set a target power of the engine with respect to a power required to propel the hybrid vehicle to a higher value in the situation where the amount of the particulate matter accumulated in the particulate filter is equal to or smaller than the predetermined amount, compared to the target power set in the situation where the amount of the particulate matter accumulated in the particulate filter is greater than the predetermined amount.

5. The driving force control system for the hybrid vehicle as claimed in claim 1, wherein the controller is further configured to:
    determine the amount of the particulate matter accumulated in the particulate filter based on a pressure difference between upstream and downstream of the particulate filter; and
    detect the pressure difference in the motor mode by flowing gas containing air through the particulate filter by rotating the engine while stopping a fuel supply to the engine.

* * * * *